(12) United States Patent
Soyama et al.

(10) Patent No.: US 10,538,025 B2
(45) Date of Patent: Jan. 21, 2020

(54) CONTAINER WITH SYNTHETIC RESIN WINDOW, PREFORM, AND PREFORM INJECTION MOLDING APPARATUS

(71) Applicants: Hideaki Soyama, Tokyo (JP); Yusuke Ishii, Tokyo (JP)

(72) Inventors: Hideaki Soyama, Tokyo (JP); Yusuke Ishii, Tokyo (JP)

(73) Assignee: YOSHINO KOGYOSHO CO., LTD., Tokyo (JP)

( * ) Notice: Subject to any disclaimer, the term of this patent is extended or adjusted under 35 U.S.C. 154(b) by 0 days.

(21) Appl. No.: 15/674,587

(22) Filed: Aug. 11, 2017

(65) Prior Publication Data

US 2018/0009150 A1 Jan. 11, 2018

Related U.S. Application Data

(62) Division of application No. 14/646,785, filed as application No. PCT/JP2013/082299 on Nov. 30, 2013.

(30) Foreign Application Priority Data

Nov. 30, 2012 (JP) .................................. 2012-263131

(51) Int. Cl.
*B65D 1/40* (2006.01)
*B29B 11/14* (2006.01)
(Continued)

(52) U.S. Cl.
CPC .............. *B29C 49/06* (2013.01); *B29B 11/14* (2013.01); *B29C 45/1603* (2013.01);
(Continued)

(58) Field of Classification Search
CPC . B29C 49/06; B29C 45/1603; B29C 45/1684; B29C 49/08; B65D 1/40;
(Continued)

(56) References Cited

U.S. PATENT DOCUMENTS 3,343,568 A 9/1967 Branscum et al.
4,832,211 A 5/1989 Matthews et al.
(Continued)

FOREIGN PATENT DOCUMENTS

EP 1 559 529 A2 8/2005
JP S58-82233 U 6/1983
(Continued)

OTHER PUBLICATIONS

Apr. 6, 2018 Office Action issued in U.S. Appl. No. 15/675,129.
(Continued)

*Primary Examiner* — Michael C Miggins
(74) *Attorney, Agent, or Firm* — Oliff PLC

(57) ABSTRACT

To solve a problem associated with formation of a transparent window portion in a biaxially stretch blow molded container by a nozzle structure of an injection molding apparatus, provided is a biaxially stretch blow molded container formed with a clearly transparent window portion in longitudinal strip shape by effectively preventing mixture of colored resin to window portion. Injection molding apparatus includes in nozzle portion a longitudinal groove flow path, wherein a transparent B resin flows. By, for example, reducing and increasing, respectively, the width and depth of the longitudinal groove flow path on the downstream side, and engraving slits in an inner mandrel and even in a front end portion of a stopper pin, flowability of the B resin in a horizontal direction is enhanced.

2 Claims, 11 Drawing Sheets

(51) Int. Cl.
*B29C 49/06* (2006.01)
*B65D 1/02* (2006.01)
*B29C 45/16* (2006.01)
*B65D 25/54* (2006.01)
*B29C 49/08* (2006.01)

(52) U.S. Cl.
CPC ........ *B29C 45/1684* (2013.01); *B65D 1/0207* (2013.01); *B65D 1/40* (2013.01); *B65D 25/54* (2013.01); *B29B 2911/1402* (2013.01); *B29B 2911/1404* (2013.01); *B29B 2911/1408* (2013.01); *B29B 2911/1414* (2013.01); *B29B 2911/14026* (2013.01); *B29B 2911/14033* (2013.01); *B29B 2911/14053* (2013.01); *B29B 2911/14066* (2013.01); *B29B 2911/14093* (2013.01); *B29B 2911/14113* (2013.01); *B29C 49/08* (2013.01)

(58) Field of Classification Search
CPC ....... B65D 1/0207; B65D 25/54; B29B 11/14; B29B 2911/1402; B29B 2911/14026; B29B 2911/14033; B29B 2911/1404; B29B 2911/14053; B29B 2911/14066; B29B 2911/1408; B29B 2911/14093; B29B 2911/14113; B29B 2911/1414
See application file for complete search history.

(56) References Cited

U.S. PATENT DOCUMENTS

| | | |
|---|---|---|
| 4,890,994 A | 1/1990 | Shapler et al. |
| 5,301,840 A | 4/1994 | Sun |
| 6,077,579 A | 6/2000 | De Laforcade |
| 6,082,591 A | 7/2000 | Healey |
| 6,364,163 B1 | 4/2002 | Mueller |
| 6,764,639 B1 | 7/2004 | Richter |
| 6,974,556 B2 | 12/2005 | Bemis et al. |
| 6,988,629 B2 | 1/2006 | Pedmo et al. |
| 2008/0241447 A1 | 10/2008 | Shi |
| 2012/0031401 A1 | 2/2012 | Berger et al. |
| 2012/0256356 A1 | 10/2012 | Akiyama et al. |
| 2017/0157821 A1 | 6/2017 | Soyama et al. |
| 2018/0009150 A1 | 1/2018 | Soyama et al. |

FOREIGN PATENT DOCUMENTS

| | | | | |
|---|---|---|---|---|
| JP | S60-19410 U | | 2/1985 | |
| JP | S6019410 | * | 2/1985 | ............. B29B 11/14 |
| JP | H02-162027 A | | 6/1990 | |
| JP | H03-076624 A | | 4/1991 | |
| JP | H03-92320 A | | 4/1991 | |
| JP | H03150122 A | | 6/1991 | |
| JP | 2005-153901 A | | 6/2005 | |
| JP | 2008-207851 A | | 9/2008 | |
| JP | 2010-012605 A | | 1/2010 | |
| WO | 2009/154845 A2 | | 12/2009 | |

OTHER PUBLICATIONS

Jan. 15, 2018 Office Action issued in Chinese Patent Application No. 201610232516.8.
Mar. 7, 2018 Office Action issued in U.S. Appl. No. 14/646,785.
Dec. 4, 2015 Office Action issued in Chinese Patent Application No. 201380062345.3.
Apr. 18, 2016 Office Action issued in Canadian Patent Application No. 2,893,024.
Apr. 5, 2016 Office Action issued in Japanese Patent Application No. 2012-263131.
Apr. 28, 2016 Office Action issued in Korean Patent Application No. 10-2015-7013798.
Jun. 1, 2016 Extended Search Report issued in European Patent Application No. 13858872.8.
Jul. 7, 2016 Office Action issued in Australian Patent Application No. 2013352982.
Nov. 28, 2016 Office Action issued in Korean Patent Application No. 10-2015-7013798.
Jan. 25, 2017 Office Action issued in Canadian Patent Application No. 2,893,024.
Feb. 20, 2017 Office Action issued in Taiwanese Patent Application No. 102144055.
Mar. 22, 2017 Extended Search Report issued in European Patent Application No. 16197833.3.
Database WPI. XP-002767987 . Thomas Scientific, London, Great Britain.
May 2, 2017 Office Action issued in Chinese Patent Application No. 201610232516.8.
Mar. 4, 2014 International Search Report issued in International Application No. PCT/JP2013/082299.
Jun. 2, 2015 International Preliminary Report on Patentability issued in International Application No. PCT/JP2013/082299.
Sep. 13, 2017 Office Action issued in Canadian Patent Application No. 2,893,024.
Aug. 15, 2017 Office Action issued in U.S. Appl No. 14/646,785.
Feb. 3, 2016 Office Action issued in Australian Application No. 2013352982.
Jun. 4, 2018 Office Action issued in Canadian Patent Office 2,893,024.
Dec. 12, 2018 Office Action issued in U.S. Appl. No. 14/646,785.
Jan. 9, 2019 Office Action issued in Canadian Patent Application No. 2,893,024.
Apr. 18, 2019 Office Action issued in U.S. Appl. No. 14/646,785.
Dec. 2, 2016 Office Action issued in Japanese Patent Application No. 2012-263131.
Aug. 21, 2019 Office Action issued in European Patent Application No. 16 197 833.3.
Aug. 29, 2019 Office Action issued in Canadian Patent Application No. 2,893,024.
Sep. 3, 2019 Office Action issued in U.S. Appl. No. 14/646,785.

* cited by examiner

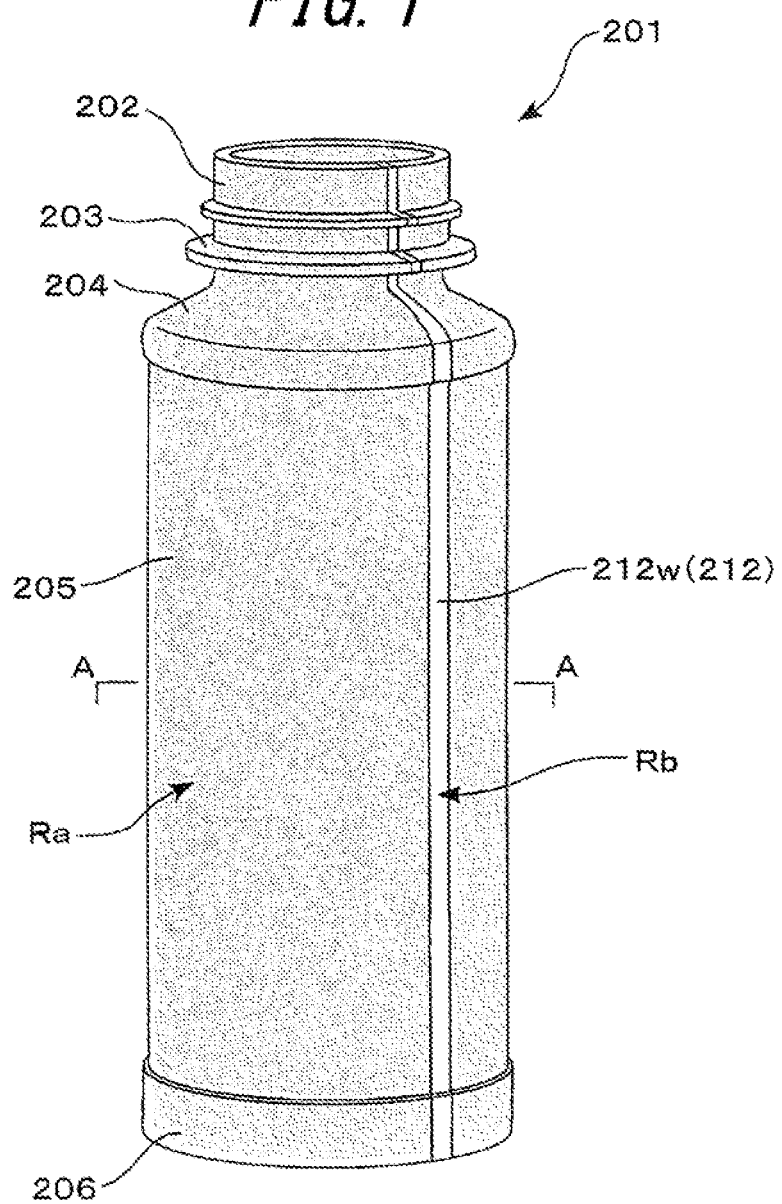

CONTAINER WITH SYNTHETIC RESIN WINDOW, PREFORM, AND PREFORM INJECTION MOLDING APPARATUS

This is a Divisional Application of U.S. application Ser. No. 14/646,785 filed May 22, 2015, which is a 371 of international application PCT/JP2013/082299, Filed Nov. 30, 2013, which claims priority to foreign application No. JP 2012-263131, filed Nov. 30, 2012 in Japan. The disclosure of the prior applications is hereby incorporate by reference herein in their entirety.

TECHNICAL FIELD

This disclosure relates to a biaxially stretch blow molded synthetic resin container including a translucent or semi-translucent window portion through which an amount of a remaining content may be identified from an outside, a test-tube-shaped preform that is a precursor of the container, and an injection molding apparatus used for molding the preform.

BACKGROUND

Conventionally, blow molded containers made of synthetic resins are widely used in applications such as beverages, foods, detergents, cosmetics, and chemicals. Such a container often conceals the content for the purpose, for example, of protecting the content against ultraviolet rays and improving appearance and design quality.

Examples of ways of concealing the content from an outside view includes opaquing the container itself with a colored resin, opaquing an outer surface of the container by painting, and applying an overcoat of a shrink film, which is opaque or with opaque printing on a surface thereof, onto the outer surface of the container.

However, concealing the content from the outside view as such poses a problem that the amount of the remaining content may not be identified from the outside, and this leads to inconvenience and anxiety in use. Another problem arising when filling the content again for use is that too much content might be added to cause it to overspill due to invisibility of how much content is filled.

One possible way to overcome the aforementioned problems is to form a window portion, by masking a part of a container which is transparent or semi-transparent (hereinafter, collectively referred to as transparent) and painting the container and by peeling the masking after the painting. In a case of the shrink film, such a window portion may be formed by leaving a portion of the shrink film unprinted and transparent to allow the amount of the remaining content to be identified from the outside.

Furthermore, as described in Patent Literature 1, a blow molded container produced by blow molding an extrusion molded cylindrical parison, that is to say, by direct blow molding, may be relatively easily formed with a transparent window portion in a longitudinal strip shape after the blow molding, by coloring, during the extrusion molding of the parison, a majority of the parison to make the parison opaque while flowing an uncolored transparent resin into a portion of a cylindrical flow path formed in a dice used for the extrusion molding.

CITATION LIST

Patent Literature

PTL 1: JP2005153901A

SUMMARY

As described above, the container produced by the direct blow molding may be formed with a transparent window portion in the longitudinal strip shape relatively easily.

On the other hand, a biaxially stretch blow molded container made of polyethylene terephthalate (hereinafter, abbreviated as PET) that is formed by biaxially stretch blow molding an injection molded preform faces problems such as mixture of a colored resin into a portion of such a transparent window portion and deterioration in the transparency, even when a transparent window portion in the longitudinal strip shape is desired to be formed in the container.

This disclosure has been conceived to solve the aforementioned problems associated with the formation of a window portion in the biaxially stretch blow molded container by a nozzle structure of an injection molding apparatus. It could be helpful to provide a biaxially stretch blow molded container that is formed with a clearly transparent window portion in the longitudinal strip shape by effectively preventing the mixture of the colored resin.

This disclosure relates to the biaxially stretch blow molded synthetic resin container with a window, the test-tube-shaped preform which is the precursor of the container, and the injection molding apparatus used for molding the preform. For convenience of description, a description is given below of the injection molding apparatus, the preform, and the container with a window, in the stated order.

Firstly, one aspect of this disclosure resides in an injection molding apparatus that injection molds a test-tube-shaped preform that is subjected to biaxial stretch blow molding, the preform including a circumferential wall having a longitudinal strip-shaped portion that is made of a B resin and that is formed in a longitudinal strip shape in a circumferentially predetermined position in the circumferential wall over a predetermined height range, a remaining portion of the circumferential wall excluding the longitudinal strip-shaped portion being made of an A resin.

The injection molding apparatus includes:
a nozzle portion that supplies the A resin and the B resin which are molten along a circumferential direction; and a mold that is located in a front end of the nozzle portion.

The nozzle portion includes:
a cylindrical inner mandrel; an outer mandrel that is arranged coaxially with the inner mandrel; and a columnar shut-off pin that is inserted and arranged in the inner mandrel and that serves to release and shut off flows of the molten resins in a front end portion of the nozzle portion.

Between the inner mandrel and the outer mandrel, a cylindrical flow path and a reduced-diameter flow path are formed in the stated order in a direction toward a downstream side, the reduced-diameter flow path being configured by a cylindrical flow path tapered to have a reduced diameter toward downstream, and on downstream of the reduced-diameter flow path, a columnar joining flow path is formed in which the molten resins in cylindrical forms join into a columnar form, and a longitudinal groove flow path is further formed to interrupt the cylindrical flow path and the reduced-diameter flow path in a circumferential direction, the longitudinal groove flow path has a flow path width that is reduced on a downstream side below a predetermined position than on an upper stream side thereof and a flow path depth that is increased on the downstream side below the predetermined position than on the upper stream side thereof, and the molten B resin is supplied to the longitudinal groove flow path, and the molten A resin is supplied to the cylindrical flow path excluding the longitudinal groove flow path, and the molten resins that have joined into the columnar form are injected and filled into a cavity of the mold via the joining flow path of the nozzle portion and a pin gate located in a position of the cavity of the mold that corresponds to a middle of a bottom wall of a bottom portion of the preform.

In the above regard, assume that, similarly to the dice used in the direct blow molding of the parison as described above, merely the cylindrical flow path is arranged in the nozzle portion included in the injection molding apparatus and that the B resin is caused to flow in a longitudinal strip shape in a portion of the A resin to flow the A resin and the B resin along the circumferential direction into a cylindrical form.

However, in the case of the injection molding of the test-tube-shaped parison, the cylindrically formed molten resins do not remain in the cylindrical forms but are joined into a columnar form in the front end of the nozzle portion, and the joined molten resins in the columnar form are injected and flowed to be filled into the test-tube-shaped cylindrical cavity via the pin gate.

In the sectional plan view, the cylindrically joined and formed parison which is used in the direct blow molding includes the A resin in an annular form and the B resin that completely interrupts the A resin in the radial direction.

On the other hand, in the sectional plan view, the molten resins joined and formed in the columnar form in the front end portion of the nozzle portion as described above include the A resin in the columnar form and the B resin that is laminated in the columnar A resin, in the form of a slit extending from a peripheral edge portion to a center position of the columnar A resin.

Accordingly, upon the joining, the A resin and the B resin collide with each other in the vicinity of a center position of the columnar flow path. At this collision time, the A resin might push the B resin to a peripheral direction and prevent the B resin from being laminated to the center position of the columnar flow path.

In this situation, even when a window portion in the longitudinal strip shape is desired to be formed in the circumferential wall of the container by using a transparent resin as the B resin, various problems arise, such as the mixture of the colored resin into a portion of the transparent window portion, for example, a portion of the transparent window portion that is located on an inner circumferential surface side, and the deterioration in transparency in the portion of the window portion as described above.

On the other hand, when the B resin is laminated in the form of a slit extending beyond the center position of the columnar flow path, even though the transparent B resin might mix into the inner circumferential surface side of the circumferential wall made of the colored A resin, the transparent B resin is covered by the colored A resin, and therefore, appearance properties will not be deteriorated.

The structure of the injection molding apparatus according to the above aspect has been conceived based on a result of analysis of a phenomenon of how the B resin is laminated in the form of a slit in the A resin in the columnar flow path in which the resins have been joined from the cylindrical form into the columnar form.

The basic technical idea resides in that the flow path of the B resin in the nozzle portion is designed to allow the B resin, being joined into the columnar form in the front end portion of the nozzle portion, to be laminated in the columnar flow path, in the form of a slit extending sufficiently to reach at least the center position in the direction from the peripheral edge to the center position, and even in the form of a slit extending from the peripheral edge to and beyond the center position in consideration of variation in the position in which the B resin is laminated due to a slight variance in conditions of the injection molding and in consideration of possible fluctuations in flow behavior of the molten resins injected from the pin gate.

According to the injection molding apparatus with the above structure, preferably, the structure of the nozzle portion provides the following advantageous effects.

Firstly, by forming the longitudinal groove flow path to interrupt the cylindrical flow path and the reduced-diameter flow path in the circumferential direction, segmentation between the A resin and the B resin is clarified in the circumferential direction.

Secondly, by reducing and increasing, respectively, the flow path width and the flow path depth of the longitudinal groove flow path on the downstream side below the predetermined position than on the upper stream side thereof, a decrease in pressure of the B resin flowing in the longitudinal groove flow path is prevented, and the flow of the B resin is directed further to the horizontal direction, that is to say, to a central axis of the nozzle portion.

As a result, upon the joining in the front end portion of the nozzle portion, the B resin provides force to push the A resin toward a peripheral direction in the vicinity of the center position of the columnar flow path. Accordingly, the B resin is laminated in the form of a slit extending sufficiently to reach at least the center position, and even beyond the center position.

Additionally, in the above structure, the A resin and the B resin are used for convenience of differentiation of the two resins. The A resin and the B resin may be differentiated in terms of the kinds of the synthetic resins or may be the same kind of two synthetic resins that are differentiated in terms of whether the synthetic resins are colored or uncolored.

For example, to form the longitudinal strip-shaped transparent window portion in the container, the same two synthetic resins, one for the A resin that is colored to make it opaque and the other one for the B resin that is left uncolored and transparent, may be used.

Furthermore, in the description of the above structure and in the description below, terms, e.g., the longitudinal groove flow path, implying directions such as the longitudinal and horizontal directions are used for convenience. Herein, the longitudinal direction corresponds to the central axis direction of the nozzle portion, and the horizontal direction corresponds to the direction that is perpendicular to the central axis direction.

Moreover, although the above structure includes, as the structural requirements, the "longitudinal groove flow path having a flow path width that is reduced on a downstream side below a predetermined position (in a predetermined range) than on an upper stream side thereof and a flow path depth that is increased on the downstream side below the predetermined position than on the upper stream side thereof", the flow path width and the flow path depth do not necessarily need to be respectively reduced and increased in the same predetermined range, and the flow path width and the flow path depth may be respectively reduced and increased in different ranges as appropriate.

Another aspect of this disclosure resides in the injection molding apparatus according to the above aspect, wherein, in the cylindrical flow path and the reduced-diameter flow path, a pair of guiding ribs in the form of longitudinal ridges is arranged in line to partition the cylindrical flow path and the reduced-diameter flow path in the circumferential direction, and the longitudinal groove flow path is formed between the pair of guiding ribs.

The above structure is specifically designed to form the longitudinal groove flow path interrupting the cylindrical flow path and the reduced-diameter flow path in the circumferential direction, and such a structure may be formed by leaving portions of the inner mandrel unprocessed when cutting the inner mandrel to form the flow paths.

Yet another aspect of this disclosure resides in the injection molding apparatus according to the above aspect, wherein the longitudinal groove flow path has a flow path width that is reduced from a position of a lower end portion of the cylindrical flow path.

With the above structure, the flow path width of the longitudinal groove flow path is reduced before the longitudinal groove flow path reaches the reduced-diameter flow path. As a result, the pressure of the flow of the B resin along the taper in the reduced-diameter flow path is increased, and flowability of the B resin in the horizontal direction is enhanced. This further ensures that the B resin may be laminated in the form of a slit extending sufficiently to reach at least the center position in the columnar flow path, and even in the form of a slit extending beyond the center position.

Yet another aspect of this disclosure resides in the injection molding apparatus according to the above aspect, wherein the inner mandrel forming the reduced-diameter flow path is engraved with a slit having an inclination angle that is greater than an inclination angle that the tapered reduced-diameter flow path forms with respect to a central axis of the nozzle portion, in order to increase a flow path depth of the longitudinal groove flow path.

With the above structure, flowability of the B resin in the horizontal direction is further enhanced, and this further ensures that the B resin may be laminated in the form of a slit extending sufficiently to reach at least the center position in the columnar flow path, and even in the form of a slit extending beyond the center position.

Yet another aspect of this disclosure resides in the injection molding apparatus according to the above aspect, wherein, in a release position of the shut-off pin, the slit engraved in the inner mandrel is further extended into the shut-off pin to engrave a slit in a portion of the shut-off pin that is located from a circumferential wall to a front end surface thereof, the slit having the same inclination angle as the slit engraved in the inner mandrel.

Yet another aspect of this disclosure resides in the injection molding apparatus according to the above aspect, wherein, in the front end surface of the shut-off pin, the slit is engraved from a peripheral edge toward a center and beyond a center position of the front end surface.

According to the above two structures, the slit forming the longitudinal flow path is extended from the inner mandrel into the shut-off pin, and this further ensures that the B resin may be stably laminated in the form of a slit extending sufficiently to reach at least the center position in the columnar flow path, and even in the form of a slit extending beyond the center position.

Secondly, a description is given of a structure of the preform according to this disclosure. The preform with a structure such as the following may be molded by the injection molding apparatus described above.

One aspect of this disclosure resides in an injection molded test-tube-shaped preform that is subjected to biaxial stretch blow molding.

The preform includes a circumferential wall including a longitudinal strip-shaped portion that is made of a transparent or a semi-transparent resin and that is formed in a longitudinal strip shape in a circumferentially predetermined position in the circumferential wall over a predetermined height range.

The aforementioned injection molding apparatus is capable of providing the preform in which the clear longitudinal strip-shaped portion, which is made of the transparent B resin, is formed to interrupt the circumferential wall, which is generally made of the opaque A resin, in the circumferential direction, by effectively preventing the mixture of the A resin to the longitudinal strip-shaped portion.

Additionally, the aforementioned injection molding apparatus may be configured to form the longitudinal strip-shaped portion over an entire height range of the preform. However, by, for example, shutting off and starting the supply of the B resin to the longitudinal groove flow path at appropriate timing by arranging a check valve or other means on the upstream side, the longitudinal strip-shaped portion may also be formed over a predetermined height range of the preform excluding, for example, the mouth tubular portion.

Another aspect of this disclosure resides in the preform according to the above aspect, further including a bottom portion, wherein the longitudinal strip-shaped portion is formed over an entire height range measured from a bottom wall of the bottom portion. Such a preform in which the clear longitudinal strip-shaped portion made of a transparent resin is formed over the entire height range would be difficult to achieve conventionally.

Yet another aspect of this disclosure resides in the preform according to the above aspect, wherein, in the bottom wall of the bottom portion, the longitudinal strip-shaped portion is arranged from a peripheral edge toward a center and beyond a center position of the bottom wall. A preform with such a structure would be difficult to achieve conventionally.

Thirdly, a description is given of the biaxially stretch blow molded synthetic resin container with a window according to this disclosure. The container with a structure such as the following may be molded by biaxially stretch blow molding the preform described above.

One aspect of this disclosure resides in a synthetic resin container with a window that is produced by biaxially stretch blow molding a test-tube-shaped preform, the synthetic resin container with a window including a circumferential wall including a longitudinal strip-shaped portion that is made of a transparent or a semi-transparent resin and that is formed in a longitudinal strip shape in a circumferentially predetermined position in the circumferential wall over a predetermined height range, the longitudinal strip-shaped portion serving as a window portion.

The container with a window with the above structure may be produced by biaxially stretch blow molding the aforementioned preform in which the clear longitudinal strip-shaped portion, which is made of the transparent B resin, is formed by effectively preventing the mixture of the opaque A resin to the longitudinal strip-shaped portion. Accordingly, a container formed with the clearly transparent window portion in the longitudinal strip shape is achieved.

Another aspect of this disclosure resides in the container with a window according to the above aspect, further including a bottom portion, wherein the longitudinal strip-shaped portion is formed over an entire height range measured from a bottom wall of the bottom portion. Such a biaxially stretch blow molded container with a window in which the clear longitudinal strip-shaped portion made of the transparent resin is formed over the entire height range would be difficult to achieve conventionally.

Of course, the longitudinal strip-shaped portion does not necessarily need to be formed over the entire height range as described above and may be formed over a predetermined height range determined in advance in accordance with the intended use.

Yet another aspect of this disclosure resides in the container with a window according to the above aspect, wherein, in the bottom wall of the bottom portion, the longitudinal strip-shaped portion is arranged from a peripheral edge toward a center and beyond a center position of the bottom wall. A biaxially stretch blow molded container formed with such a structure could not be achieved conventionally.

In the above regard, although the longitudinal strip-shaped is preferably arranged beyond the center position of the bottom wall as described above, the extent of the longitudinal strip-shaped may also reach at most the center position or to reach the vicinity of the center position.

With the above structures, the injection molding apparatus, the preform, and the container with a window according to this disclosure provide the following advantageous effects.

The injection molding apparatus is capable of forming the longitudinal groove flow path, in which the B resin in the nozzle portion flows, in a shape that enhances flowability of the B resin in the horizontal direction, by, for example, reducing and increasing, respectively, the width and depth of the longitudinal groove flow path on the downstream side, and engraving the slits in the inner mandrel and even in the front end portion of the stopper pin. As a result, it is ensured that the B resin may be laminated in the form of a slit extending sufficiently to reach at least the center position in the columnar flow path, and even in the form of a slit extending beyond the center position.

The injection molding apparatus is also capable of injection molding the test-tube-shaped preform in which the clear longitudinal strip-shaped portion, which is made of the transparent B resin, is formed to interrupt the circumferential wall, which is generally made of the opaque A resin, in the circumferential direction, by effectively preventing the mixture of the A resin to the longitudinal strip-shaped portion.

Furthermore, biaxial stretch blow molding of the above preform provides the container with a window including the longitudinal strip-shaped clearly transparent window portion.

BRIEF DESCRIPTION OF THE DRAWINGS

In the accompanying drawings:

FIG. 1 is a perspective view illustrating a container with a window according to one embodiment;

FIG. 5 is a schematic longitudinal sectional view taken along a line C-C in

FIG. 6 is a plan view of the injection molding apparatus illustrated in FIG. 5;

Figure 2A:
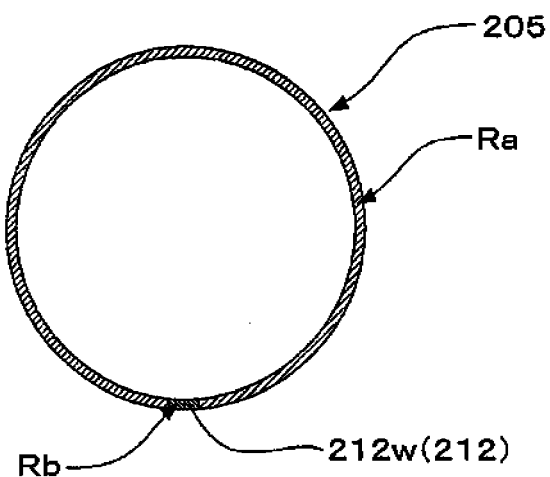
FIG. 2A is a sectional plan view taken along a line A-A in FIG. 1.

REFERENCE SIGNS LIST 1 mold
2 cavity
3 pin gate
11 nozzle portion
12$a$ introduction path (of A resin)
12$b$ introduction path (of B resin)
13$a$ supply start position (of A resin)
13$b$ supply start position (of B resin)
14 manifold
15 cylindrical flow path
16 reduced-diameter flow path
17 longitudinal groove flow path
19 joining flow path
20 shut-off pin
20$s$ slit
21 inner mandrel
21$s$ slit
21$g$ guiding rib
21$r$ eccentricity prevention rib
22 outer mandrel
101 preform
102 mouth tubular portion
103 neck ring
105 trunk portion
106 bottom portion
107 gate mark
112 longitudinal strip-shaped portion
201 container
202 mouth tubular portion
203 neck ring
204 shoulder portion
205 trunk portion
206 bottom portion
212 longitudinal strip-shaped portion
212$w$ window portion
An1, An2 inclination angle
Ax central axis
Cx center position Hab parallel region
Hc cylindrical region
Ht tapered region
Ra A resin
Rb B resin
Sa resin supply unit (of A resin)
Sb resin supply unit (of B resin)
W1, W2 flow path width

DETAILED DESCRIPTION

A biaxially stretch blow molded synthetic resin container with a window, a preform, and an injection molding device according to embodiments will be described below with reference to the drawings.

Figure 2B:
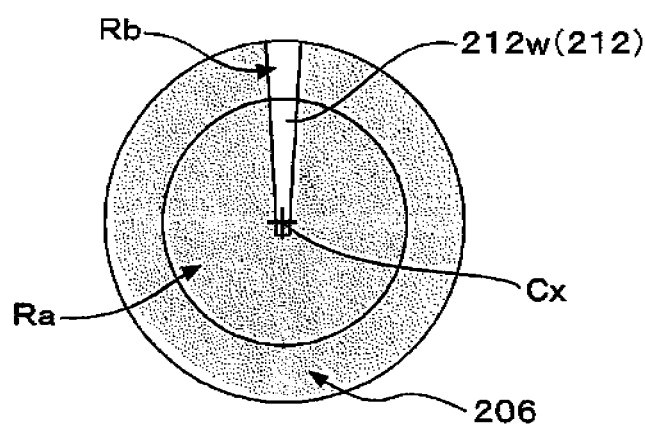
FIG. 2B is a bottom view of FIG. 1.

FIGS. 1 and 2 illustrate one embodiment of the container with a window. FIG. 1 is an overall perspective view of the container, FIG. 2A is a sectional plan view taken along a line A-A in FIG. 1, and FIG. 2B is a bottom view of FIG. 1.

A container 201 is made of a PET resin and has a bottle shape formed by biaxial stretch blow molding. The container 201 includes a mouth tubular portion 202, a shoulder portion 204 having a tapered tubular shape, a trunk portion 205 having a cylindrical shape, and a bottom portion 206. The mouth tubular portion 202 is provided on a circumference thereof with a neck ring 203.

The container 201 is formed with the A resin Ra, which is obtained by coloring a PET resin opaque white, and the B resin Rb, which is an uncolored PET resin. Substantially the entire container 201 is made of the opaque A resin Ra, and a longitudinal strip-shaped portion 212, which is made of the transparent B resin Rb, is located in a circumferentially predetermined position in a circumferential wall of the container 201 over the entire height range measured from un upper end of the mouth tubular portion 202 to a bottom wall of the bottom portion 206. The longitudinal strip-shaped portion 212 is utilized as a window portion 212w through which an inside of the container 201 is visible and through which the amount of a remaining content is identified.

In the sectional plan view as illustrated in FIG. 2A, substantially the entire circumferential wall is made of the A resin Ra, and the longitudinal strip-shaped portion 212 made of the B resin Ra is laminated in the form of a slit along the circumferential direction in such a manner as to interrupt the A resin Ra portion.

The longitudinal strip-shaped portion 212 has a horizontal width that varies according to respective stretch (draw) ratios of portions in the horizontal direction.

With reference to a bottom view in FIG. 2B, as illustrated in the figure, in the bottom wall of the bottom portion 206, the longitudinal strip-shaped portion 212 extends from a peripheral edge to a center position Cx, and further to a position beyond the center position Cx.

The longitudinal strip-shaped portion 212 also has a fan shape arising from an increased width from the center position to the peripheral edge as a result of the biaxial stretch blow molding.

Figure 3:
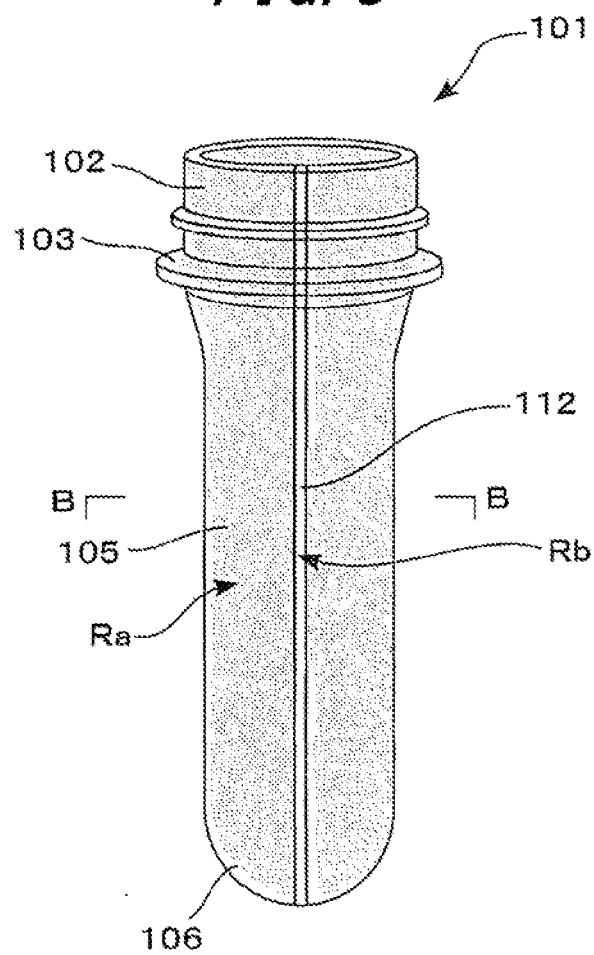
FIG. 3 is a perspective view of a preform according to one embodiment.
Figure 4A:
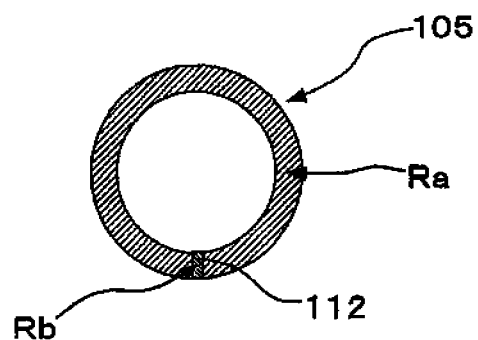
FIG. 4A is a sectional plan view of the preform taken along a line B-B in FIG. 3.
Figure 4B:
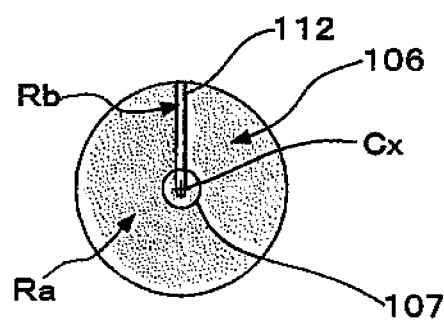
FIG. 4B is a bottom view of the preform illustrated in FIG. 3.

Next, FIGS. 3 and 4 illustrate a preform according to one embodiment. A preform 101 is a precursor of the container 201 according to the above embodiment. FIG. 3 is a perspective view, FIG. 4A is a sectional plan view taken along a line B-B in FIG. 3, and FIG. 4B is a bottom view of FIG. 3.

The preform 101 is made of a PET resin and has a test tubular shape formed by injection molding. The preform 101 includes a mouth tubular portion 102, a trunk portion 105 having a cylindrical shape, and a bottom portion 106. The mouth tubular portion 102 is provided on a circumference thereof with a neck ring 103.

The preform 101 is formed with the A resin Ra, which is obtained by coloring the PET resin opaque white, and the B resin Rb, which is the uncolored PET resin. Substantially the entire preform 101 is made of the opaque A resin Ra, and a longitudinal strip-shaped portion 112, which is made of the transparent B resin Rb, is formed in a circumferentially predetermined position in a circumferential wall of the preform 101 over the entire height range measured from un upper end of the mouth tubular portion 102 to a bottom wall of the bottom portion 106.

In the sectional plan view as illustrated in FIG. 4A, substantially the entire circumferential wall is made of the A resin Ra, and the longitudinal strip-shaped portion 112 made of the B resin Ra is laminated in the form of a slit along the circumferential direction in such a manner as to interrupt the A resin Ra portion.

With reference to a bottom view in FIG. 4B, as illustrated in the figure, in the bottom wall of the bottom portion 106, the longitudinal strip-shaped portion 112 extends from a peripheral edge to the center position Cx, and further to a position beyond the center position Cx. There is also a gate mark 107 located in a middle of the bottom wall.

Next, FIGS. 5 to 9 illustrate an injection molding apparatus according to one embodiment. The injection molding apparatus is used for injection molding the preform 101 according to the above embodiment.

Figure 5:
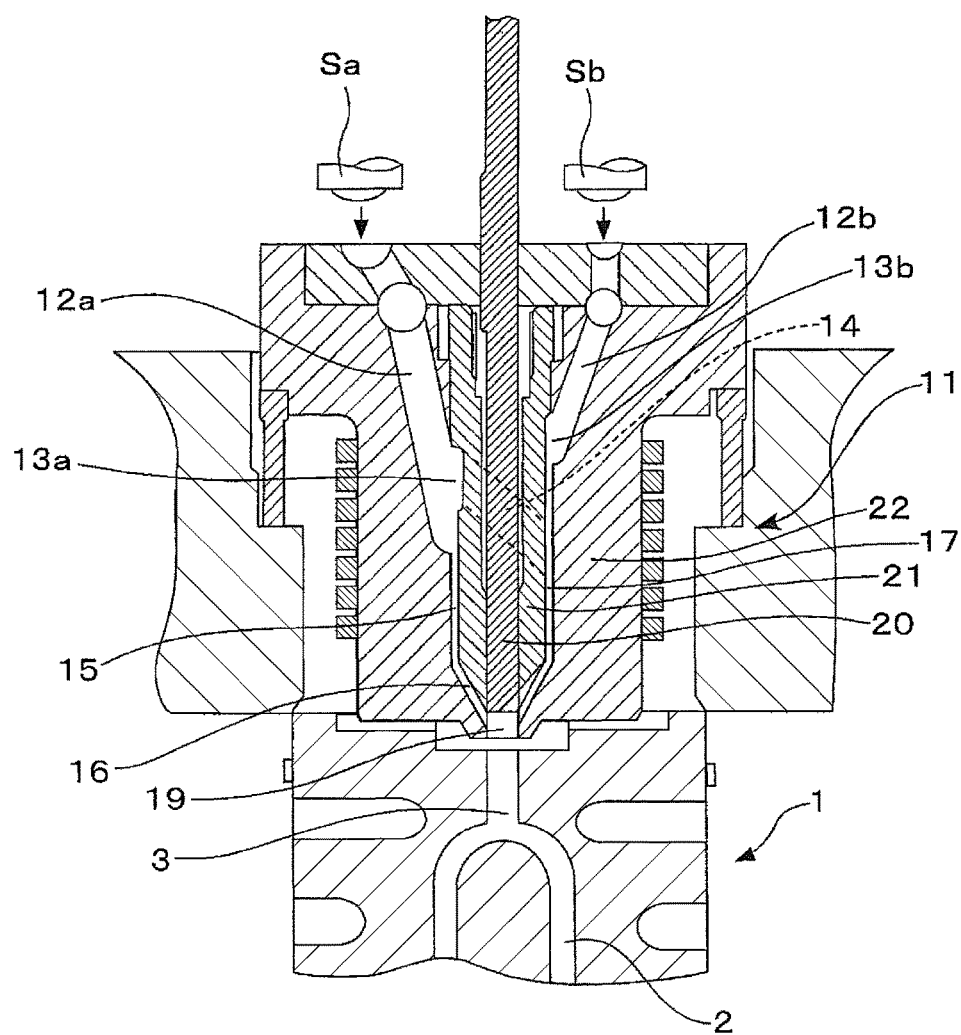
Figure 6:
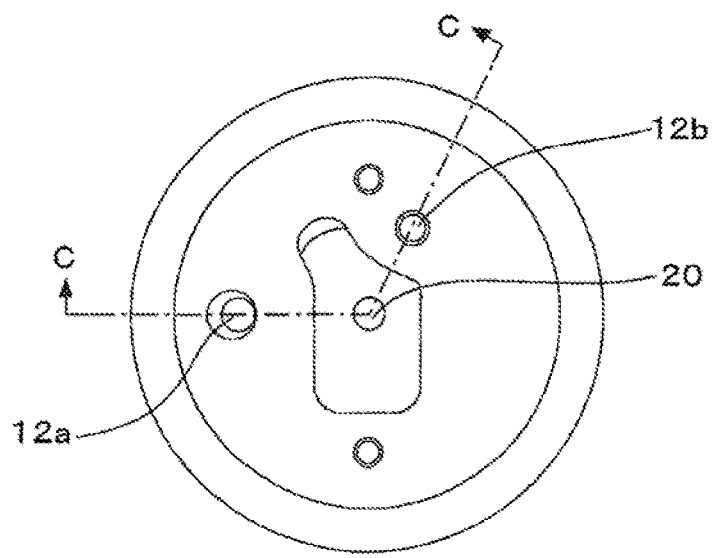
FIG. 6, illustrating a part of an injection molding apparatus according to one embodiment.
Figure 7:
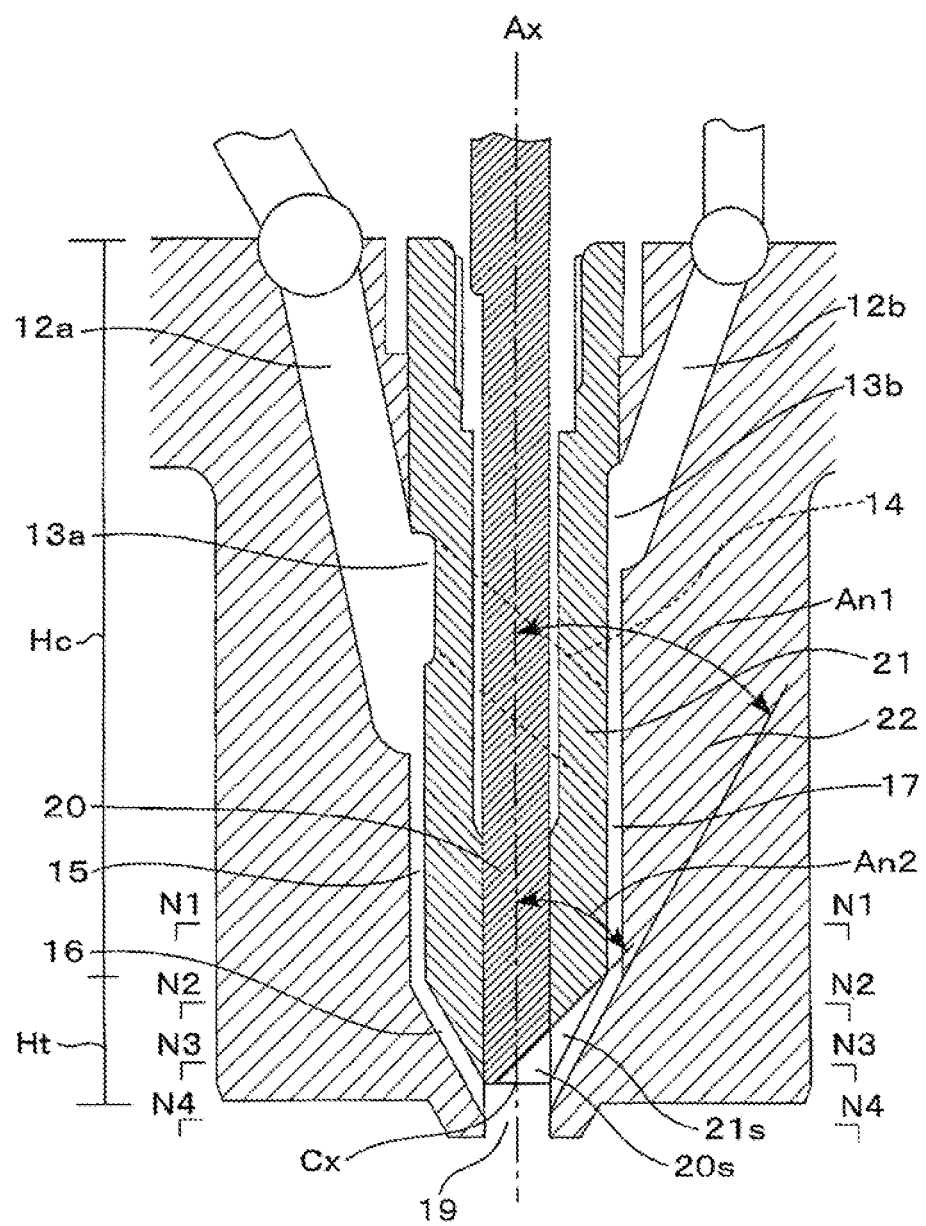
FIG. 7 is an enlarged longitudinal sectional view of a part of the vicinity of a nozzle portion of the injection molding apparatus illustrated in FIG. 5.
Figure 8:
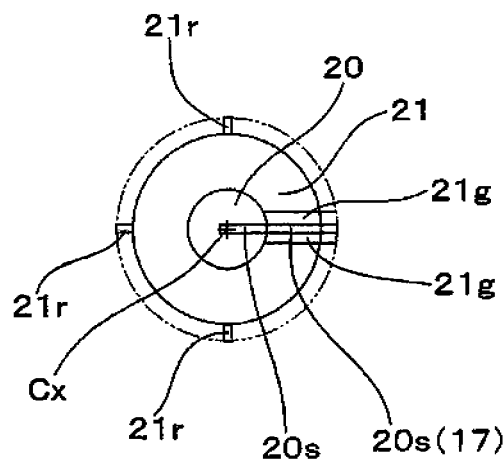
FIG. 8 is a bottom view of an inner mandrel and a shut-off pin illustrated in FIG. 5.
Figure 9:
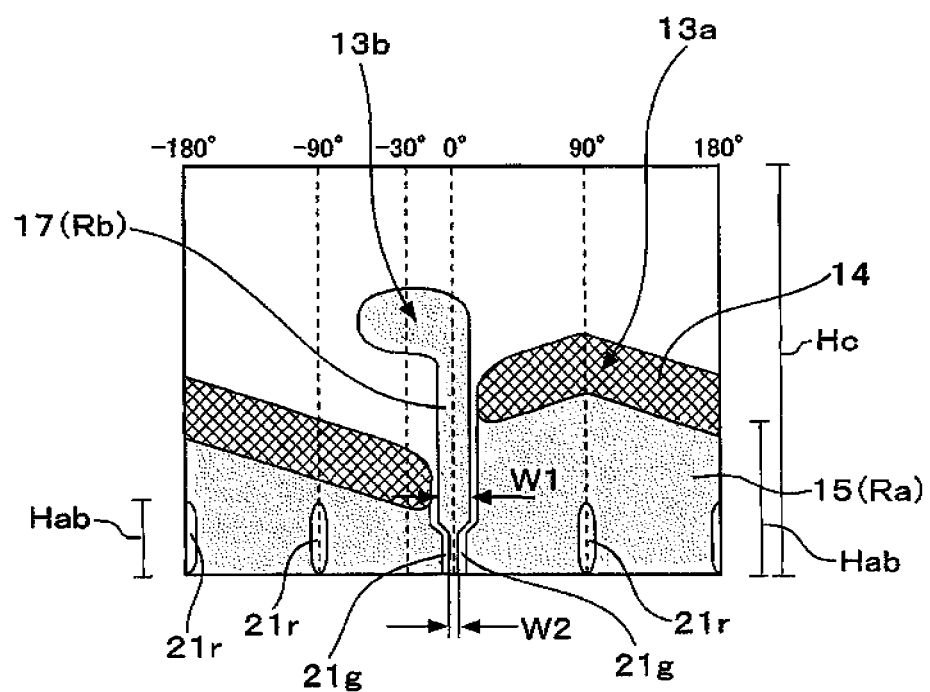
FIG. 9 is a developed view of an outer circumferential surface of an inner mandrel.

FIG. 5 is a longitudinal sectional view taken along a line C-C in FIG. 6, FIG. 6 is a plan view, FIG. 7 is a longitudinal sectional view of a part of the vicinity of a nozzle portion 11 illustrated in FIG. 5, FIG. 8 is a bottom view of an inner mandrel and a shut-off pin illustrated in FIG. 5, and FIG. 9 is a developed view of an outer circumferential surface of an inner mandrel 21 illustrated in FIG. 5.

The injection molding apparatus includes resin supply units Sa and Sb that supply the A resin and the B resin in their molten states, a nozzle portion 11 that laminates these resins in the circumferential direction, and a mold 1 that shapes the preform.

A basic structure of the nozzle portion 11 includes the cylindrical inner mandrel 21 and an outer mandrel 22 that are coaxially arranged, and a columnar shut-off pin 20 that is inserted and arranged in the inner mandrel 21 in a manner such that the shut-off pin 20 may slidably move forward and backward. The shut-off pin 20 serves to release and shut off flows of the molten resins in a front end portion of the nozzle portion 11.

As illustrated in FIG. 7, the inner mandrel 21 and the outer mandrel 22 each include a cylindrical region Hc and a tapered region Ht. In the tapered region Ht, a tapered surface forms an inclination angle An1 of 30° with respect to a central axis Ax of the nozzle portion 11.

Between the inner mandrel 21 and the outer mandrel 22, a cylindrical flow path 15 is formed in the cylindrical region Hc, and a reduced-diameter flow path 16 is formed in communication with the cylindrical flow path 15 in the tapered region. The reduced-diameter flow path 16 is configured by a cylindrical flow path tapered to have a reduced diameter toward downstream. Furthermore, the reduced-diameter flow path 16 has a front end that is formed with a columnar joining flow path 19 in which the molten resins in cylindrical forms join into a columnar form.

There is also formed a longitudinal groove flow path 17 having a longitudinal strip shape that extends to interrupt the cylindrical flow path 15 and the reduced-diameter flow path 16 in the circumferential direction.

As illustrated in FIGS. 7 and 8, in order to increase a flow path depth of the longitudinal groove flow path 17 in the tapered region Ht, a slit 21s is engraved in a manner such that the tapered surface of the inner mandrel 21 forms an inclination angle An2 of 45° with respect to the central axis Ax of the nozzle portion 11. The slit 21s is further extended into the shut-off pin 20 to form a slit 20s in a portion of the shut-off pin 20 that is located from a circumferential wall to a front end surface thereof beyond a center Cx of the front end surface.

The flow paths described above are formed by cutting the outer circumferential surface of the inner mandrel 21.

FIG. 9 is a developed view of the outer circumferential surface of the inner mandrel 21 in the cylindrical region Hc. In the figure, a circumferential position in which the longitudinal groove flow path 17 is formed is defined as 0°, and regions with different depths of the cutting are filled differently to clarify the differences.

In the figure, a region that is left white indicates a region where the cutting does not occur, that is to say, an unprocessed region which is in internal contact with an inner circumferential surface of the outer mandrel 22.

A blotted region indicates a region where the flow path having a flow path depth of 1 mm is formed. A crosshatched region indicates a flow path, i.e., a manifold, that is circumferentially formed in the form of a slant groove to distribute the A resin across the cylindrical flow path, and the depth of this flow path is 1.5 mm in a position of 90° where the A rein is supplied and the depth gradually changes to 1 mm along the circumferential direction.

The figure also illustrates an eccentricity prevention rib 21r located in three positions of 90°, −90°, and 180° (refer also to FIG. 8). The eccentricity prevention rib 21r serves to prevent eccentricity between the inner mandrel 21 and the outer mandrel 22.

As illustrated in FIG. 9, the longitudinal groove flow path 17 has a flow path width that is reduced on a downstream side than on an upper stream side thereof. In the present embodiment, the flow path width W1 on the upstream side is set 2 mm, and the flow path width W2 on the downstream side is set 0.5 mm, and the flow path width W2 is also maintained in the tapered region Ht.

Furthermore, as illustrated in FIG. 9, in a parallel region Hab, the longitudinal groove flow path 17, in which the B resin flows, and the cylindrical flow path 15, in which the A resin flows, are lined up. In the parallel region Hab, portions of the inner mandrel 21 are left unprocessed to form a pair of guiding ribs 21g and 21g in the form of longitudinal ridges arranged in line, thereby partitioning the cylindrical flow path 15, in which the A resin flows, in the circumferential direction. The guide ribs 21g and 21g also extend in the tapered region Ht (refer to FIG. 8).

To sum up the shapes of the flow paths, the cylindrical flow path 15 and the reduced-diameter flow path 16, in which the A resin flows, each have a flow path depth of 1 mm. The longitudinal groove flow path 17, in which the resin B flows, has the flow path width that is reduced in the vicinity of a lower end portion of the cylindrical region Hc, and the flow path width is 2 mm on the upstream side and is 0.5 mm on the downstream side. The longitudinal groove flow path 17 has a flow path depth of 1 mm in the cylindrical region Hc and also has a gradually increased flow path depth downward of the cylindrical region Hc due to the presence of the slit 20s and the slit 21s described above.

In the following, a description is given of molding processes of the preform 101 illustrated in FIGS. 3 and 4 using the injection molding apparatus (refer to FIGS. 5 to 9).

Firstly, the A resin, which is obtained by coloring the PET resin white, is supplied from the resin supply unit Sa to an A resin introduction path 12a and caused to flow into the cylindrical flow path 15 via a supply start position 13a and the manifold 14. On the other hand, the B resin, which is the uncolored PET resin, is supplied from the resin supply unit Sb to a B resin introduction path 12b and caused to flow to the longitudinal groove flow path 17 via a supply start position 13b.

The supply start position 13b of the B resin is located further upstream of the supply start position of the A resin.

As the resin supply units Sa and Sb, various devices, such as a screw extruder or an accumulator including a plunger attached to a front end of an extruder, may be used.

The molten A resin is shaped into a cylindrical form by the cylindrical flow path 15, and the molten B resin flows across the longitudinal groove flow path 17 to interrupt the A resin portion shaped in the cylindrical form in the circumferential direction. However, in the region where the A resin and the B resin flow in parallel, the flow path of the A resin portion is partitioned by the pair of guiding ribs 21g and 21g in the circumferential direction, and therefore, the A resin is prevented from mixing with the B resin in the flow path.

After passing through the reduced-diameter flow path 16, the molten resins, including the A resin and the B resin formed in reduced-diameter cylindrical forms, join in the front end of the reduced-diameter flow path 16 and pass through the columnar joining flow path 19 to be shaped into a columnar form.

Thus obtained columnar molten resins including the A resin and the B resin that is laminated into the A resin in the form of a slit are injected and filled into a cavity 2 via a pin gate 3 located in a position of the cavity 2 of the mold 1 that corresponds to the middle of the bottom portion of the preform (refer to FIG. 5).

FIG. 10 schematically illustrates changes in the plane sectional shapes of the molten resins from the upstream side to the downstream side of the nozzle portion 11 illustrated in FIG. 7. FIG. 10A is a sectional plan view taken along a line N1-N1 in FIG. 7, FIG. 10B is a sectional plan view taken along a line N2-N2 in FIG. 7, FIG. 10C is a sectional plan view taken along a line N3-N3 in FIG. 7, and FIG. 10D is a sectional plan view taken along a line N4-N4 in FIG. 7. FIG. 10A is the sectional plan view in the cylindrical flow path 15, in which the longitudinal groove flow path 17 has a flow path width of 0.5 mm. FIG. 10B is the sectional plan view in a middle height position in the reduced-diameter flow path 16, and FIG. 10C is the sectional plan view in the front end position of the reduced-diameter flow path 16, and FIG. 10D is the sectional plan view of the columnar form shaped in the joining flow path 19.

Figure 10A:
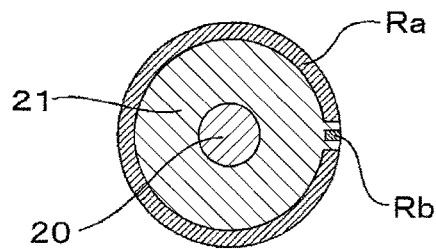
FIG. 10A is a sectional plan view taken along a line N1-N1 in FIG. 7.
Figure 10B:
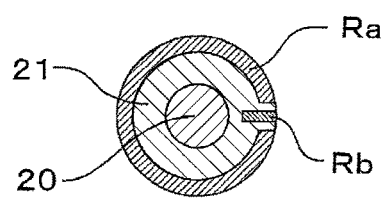
FIG. 10B is a sectional plan view taken along a line N2-N2 in FIG. 7.
Figure 10C:
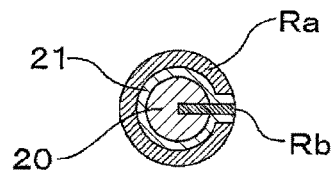
FIG. 10C is a sectional plan view taken along a line N3-N3 in FIG. 7.
Figure 10D:
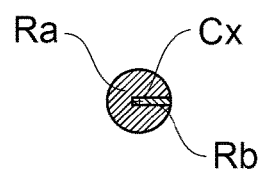
FIG. 10D is a sectional plan view taken along a line N4-N4 in FIG. 7, each of which illustrates a laminated state of an A resin and a B resin in the nozzle portion.
Figure 10E:
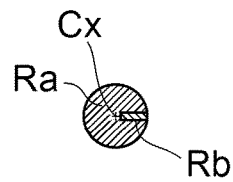
FIG. 10E is a sectional view of a comparative example in which the A resin pushes the B resin toward the peripheral portion and prevents a tip of the slit-shaped B resin Rb portion from reaching the center position Cx.

FIGS. 10E and 10D are sectional views of comparative examples.

As can be seen from FIGS. 10A to 10D, while the molten resins in the plane sectional shapes are in a ring form (as in FIGS. 10A to 10C), the B resin Rb remains laminated in the form of a slit to interrupt the ring-shaped A resin Ra in the circumferential direction. Eventually, however, the B resin Rb is shaped into a columnar form in the joining flow path 19.

Upon such joining, the A resin and the B resin collide with each other in the vicinity of a center position of the columnar flow path. At this collision time, the A resin sometimes pushes the B resin to a direction of the peripheral portion and prevents a tip of the slit-shaped B resin Rb portion from reaching the center position Cx as illustrated in FIG. 10E.

When the molten resins in the state as illustrated in FIG. 10E are injected and filled into the cavity 2 via the pin gate 3 of the mold 1 to inject mold the preform 1 illustrated in FIGS. 3 and 4, the A resin, which is colored white, mixes into a portion of the longitudinal strip-shaped portion 112, which is made of the transparent B resin Rb, for example, a portion of the longitudinal strip-shaped portion 112 that is located on an inner circumferential surface side. Accordingly, when the preform 1 is biaxially stretch blow molded into the container 1 with a window as illustrated in FIGS. 1 and 2, various problems of defects such as a portion of the window portion 112*w* being colored white and a border between the window portion 212*w* and the adjacent white circumferential wall being unclear. As a result, usability of the container 1 as a product is ruined.

In view of the above, the injection molding apparatus of the present embodiment is mainly characterized by the nozzle portion 11, preferably, the flow path shape of the longitudinal groove flow path 17, having the following structures (1) to (4).

(1) In the region where the A resin and the B resin flow in parallel, the pair of guiding ribs 21*g* and 21*g* in the form of longitudinal ridges ensures that the cylindrical flow path in which the A resin flows is partitioned in the circumferential direction.

(2) The shape of longitudinal groove flow path 17 has a flow path width that is reduced (to ¼ in the present embodiment) on the downstream side in order to prevent a decrease in pressure of the B resin.

(3) The inner mandrel 21, which is tapered to have a reduced diameter to form the reduced-diameter flow path 16, is engraved with the slit 21*s* having the inclination angle An2 that is greater than the inclination angle An1 of the reduced-diameter flow path 16 in order to increase the flow path depth of the longitudinal groove flow path 17.

(4) The slit 21*s* is further extended to form the slit 20*s* in the shut-off pin 20 in order to extend the longitudinal groove flow path 17 to the front end surface of the shut-off pin 20.

The structural requirements of the flow path shape of the longitudinal groove flow path 17 described in (1) to (4) provide an advantageous effect of enhancing flowability of the B resin in the horizontal direction, and ultimately, allowing the B resin Rb portion to be laminated in the form of a slit extending sufficiently to reach the center position Cx, or even in the form of a slit extending beyond the center position Cx, in the columnar joining flow path 19 of the nozzle portion 11 as illustrated in the sectional view of FIG. 10D.

The above structural requirements also prevent the A resin, which is colored white, from mixing into a portion of the longitudinal strip-shaped portion 112, which is made of the transparent B resin Rb, during the molding of the preform.

Furthermore, biaxial stretch blow molding of the preform provides the container 201 with a window including the longitudinal strip-shaped clearly transparent window portion 212*w* as illustrated in FIGS. 1 and 2.

Additionally, when, as illustrated in FIG. 10D, the B resin Rb portion in the form of a slit extends beyond the center position Cx, injection molding of the preform 1 illustrated in FIGS. 3 and 4 might result in mixture of the transparent B resin into the inner circumferential surface side of the circumferential wall made of the opaque white A resin in a region that is located axisymmetrical to the longitudinal strip-shaped portion 112. In this situation, however, the transparent B resin will be covered by the opaque white A resin, and therefore, an appearance problem does not occur.

Although the synthetic resin container with a window, the preform, and the injection molding apparatus of the preform according to the embodiments have been described above, this disclosure is not limited to these embodiments.

For example, although in the above embodiments the container is a round bottle made of a PET resin, any other synthetic resin such as a polypropylene resin that may be subjected to biaxial stretch blow molding may be used. Furthermore, the shape of the container may be any other shape such as a square.

Moreover, as the resin material of the window portion 212*w*, a colored transparent resin may also be used.

The shape of the longitudinal groove flow path 17 of the nozzle portion 11 is described to have the structures (1) to (4) in the present embodiments. However, the flow path may be determined as appropriate in consideration of melt viscosity or the like of the resin used, if only the flow path width is reduced and the flow path depth is increased in a predetermined range on the downstream side compared with those on the upstream side.

Figure 11A:
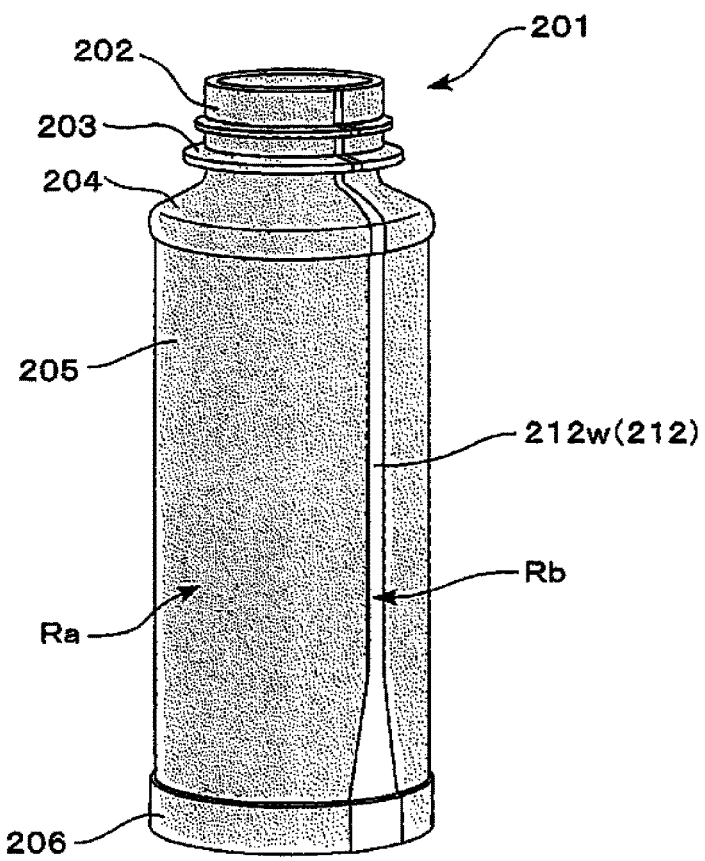
FIG. 11A is an overall perspective view of a container with a window according to another embodiment.
Figure 11B:
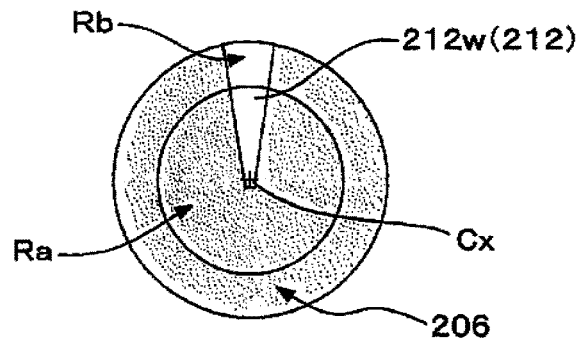
FIG. 11B is a bottom view of the container of FIG. 11A.
Figure 12A:
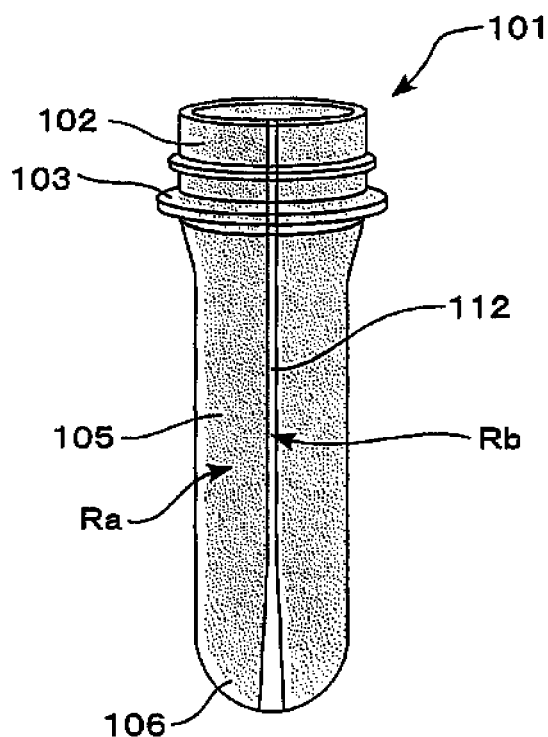
FIG. 12A is an overall perspective view of a preform according to another embodiment.
Figure 12B:
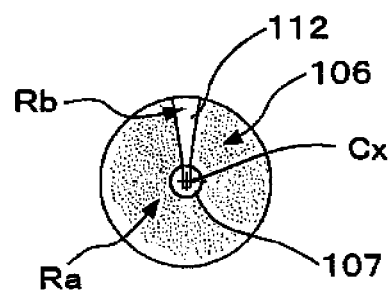
FIG. 12B is a bottom view of the preform of FIG. 12A.

Moreover, in the above embodiment of the container with a window (refer to FIGS. 1 and 2), the window portion 212*w* formed in the trunk portion 205 has a straight shape having a constant width over the entire height range. However, depending on the shape of the longitudinal groove flow path 17 and the injection pressure of the B resin, as illustrated in FIG. 12, for example, the preform 101 including the strip-shaped portion 112 whose width is increased downward in a lower end portion of the trunk portion 105 may be molded. By biaxially stretch blow molding such a preform 101, as in the container 201 with a window illustrated in FIG. 11, the width of the window portion 212*w* may be increased downward in the lower end portion of the trunk portion 205.

INDUSTRIAL APPLICABILITY

The container with a window that is produced by biaxially stretch blow molding the preform molded by the injection molding apparatus according to this disclosure includes a longitudinal strip-shaped clearly transparent window portion that is conventionally considered difficult to form, and such a container is expected to be used in a wide range of applications.

The invention claimed is:

1. An injection molded test-tube-shaped preform that is subjected to biaxial stretch blow molding, the preform comprising a circumferential wall including a longitudinal strip-shaped portion that is made of a transparent or a semi-transparent resin and that is formed in a longitudinal strip shape in a circumferentially predetermined position in the circumferential wall over a predetermined height range, wherein the preform includes a mouth tubular portion, a trunk portion having a cylindrical shape, and a bottom portion, and wherein the longitudinal strip-shaped portion is formed over an entire height range measured from a bottom wall of the bottom portion to an upper end of the mouth tubular portion.

2. The preform of claim 1, wherein in the bottom wall of the bottom portion, the longitudinal strip-shaped portion is arranged from a peripheral edge toward a center and beyond a center position of the bottom wall, and wherein a terminal portion of the longitudinal strip-shaped portion is placed between the peripheral edge of the bottom wall and the center position of the bottom wall.

\* \* \* \* \*